US007481385B2

(12) United States Patent
Narayan et al.

(10) Patent No.: US 7,481,385 B2
(45) Date of Patent: Jan. 27, 2009

(54) RECOVERY OF FUEL AND CLAY FROM A BIOMASS

(75) Inventors: Sundar Narayan, West Vancouver (CA); Calvin Leslie Kantonen, West Vancouver (CA)

(73) Assignee: First American Scientific Corp., Vancouver, British Columbia (CA)

( * ) Notice: Subject to any disclaimer, the term of this patent is extended or adjusted under 35 U.S.C. 154(b) by 576 days.

(21) Appl. No.: 10/542,188

(22) PCT Filed: Jan. 14, 2004

(86) PCT No.: PCT/CA2004/000012

§ 371 (c)(1), (2), (4) Date: Jul. 14, 2005

(87) PCT Pub. No.: WO2004/063649

PCT Pub. Date: Jul. 29, 2004

(65) Prior Publication Data

US 2006/0108459 A1 May 25, 2006

(30) Foreign Application Priority Data

Jan. 15, 2003 (CA) .................................... 2416402

(51) Int. Cl.
*B02C 1/00* (2006.01)
*B02C 11/08* (2006.01)
*B02C 21/00* (2006.01)
*B02C 23/00* (2006.01)

(52) U.S. Cl. .............................. 241/19; 241/21; 241/23

(58) Field of Classification Search .................. 241/19, 241/21, 23; 110/346
See application file for complete search history.

(56) References Cited

U.S. PATENT DOCUMENTS

| | | | |
|---|---|---|---|
| 4,213,407 A | 7/1980 | Headley | |
| 4,384,787 A | 5/1983 | Ito et al. | |
| 4,583,470 A * | 4/1986 | Hirose | 110/346 |
| 4,599,954 A * | 7/1986 | Williams | 110/346 |
| 4,702,927 A | 10/1987 | Taniguchi et al. | |
| 6,024,307 A | 2/2000 | Clarke-Ames et al. | |
| 6,085,440 A | 7/2000 | Getler | |

FOREIGN PATENT DOCUMENTS

| | | |
|---|---|---|
| DE | 16 04 934 B | 7/1970 |
| EP | 0 536 650 A | 4/1993 |
| EP | 1 072 854 A | 1/2001 |

* cited by examiner

*Primary Examiner*—Bena Miller

(57) ABSTRACT

A process is described for treating waste organic material such as the by-products from a pulp and paper mill, manure and straw to reduce its moisture content to a level at which the treated material is suitable for use as a fuel. The process involves the steps of feeding the starting material into a chamber (10) having rotating chains (42) or blades which drive the material into the interior wall (18) of the chamber (10) with sufficient force to cause some of its moisture content to separate from it. The moisture is expelled from the chamber (10) while the remaining material is carried upwardly in a stream of air to a cyclone separator (22). The conditions within the separator (22) are adjusted to further reduce its moisture level to about 15 percent by weight at which level the material is suitable for use as a fuel.

19 Claims, 3 Drawing Sheets

FIG.1.
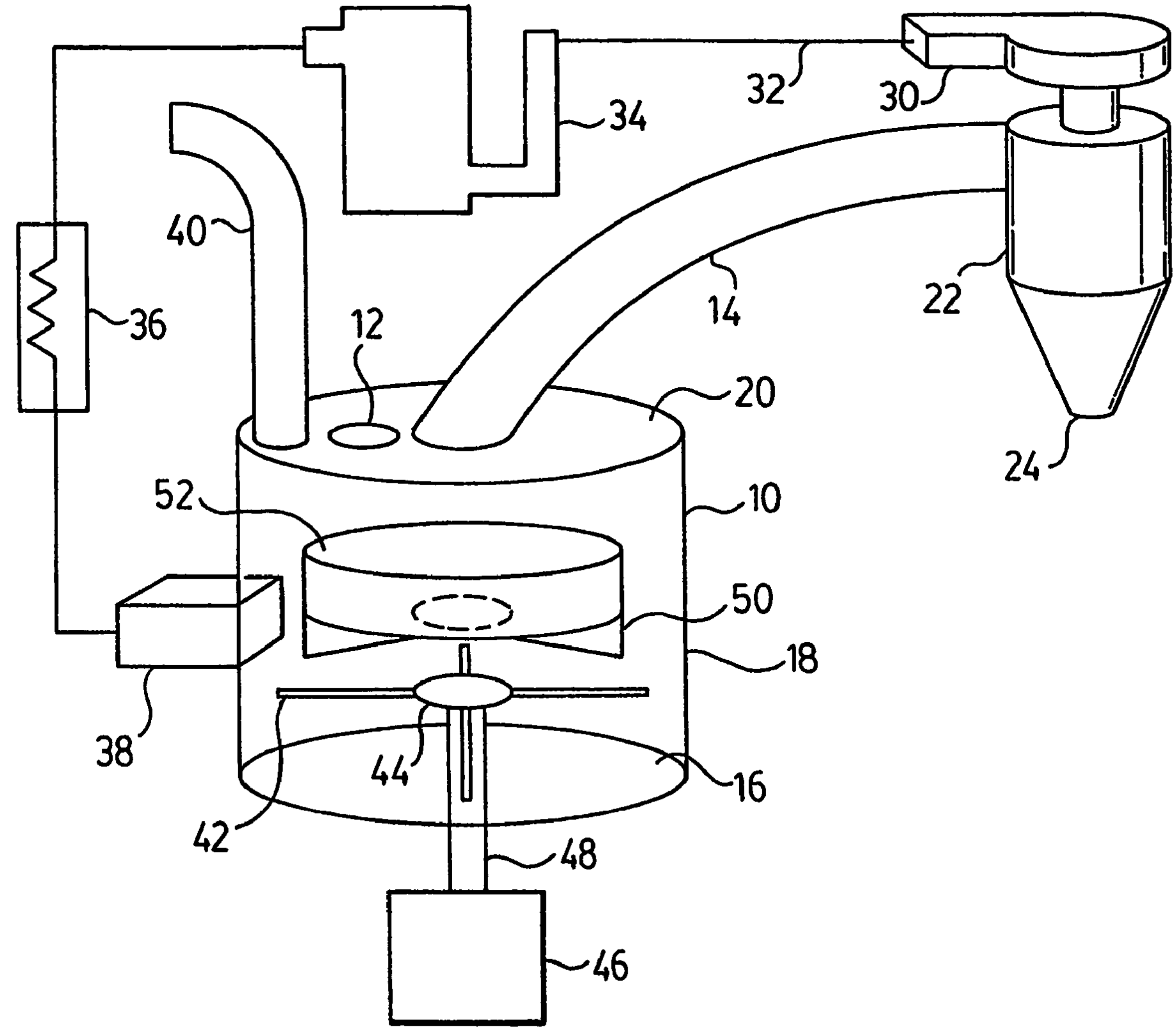
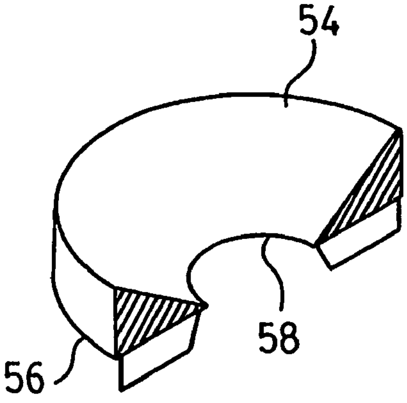
FIG. 2.

FIG. 3.
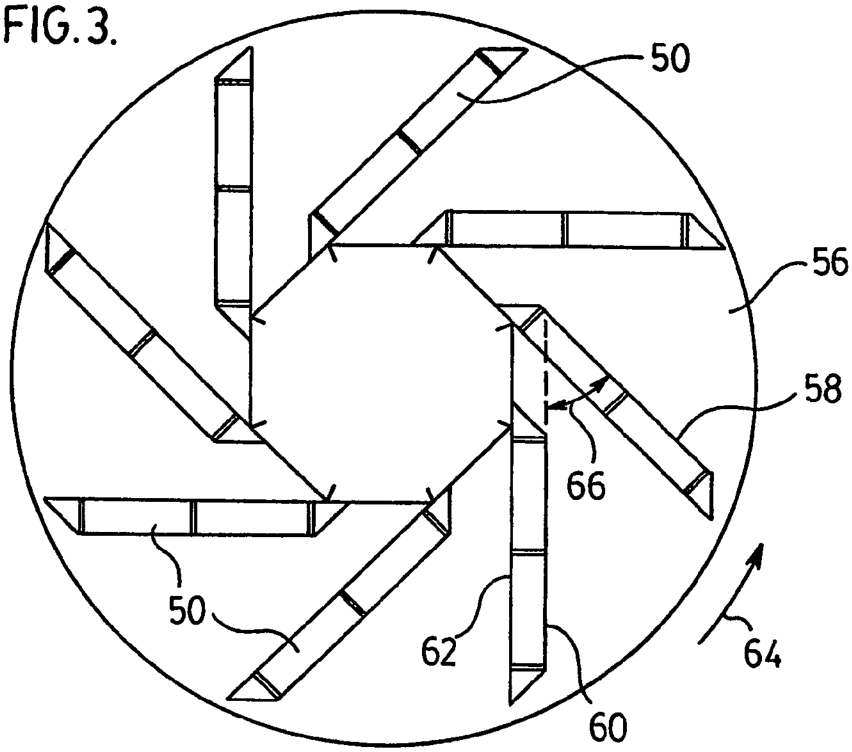
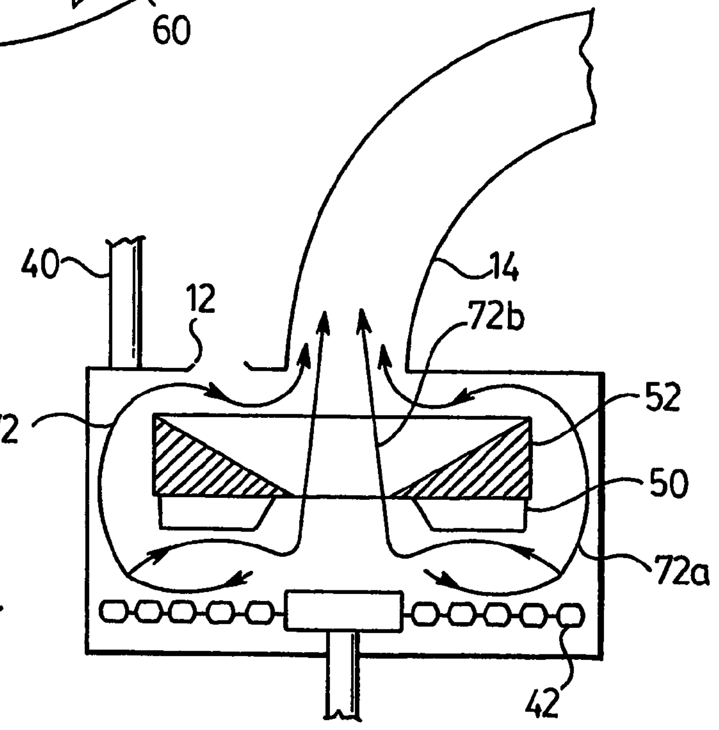
FIG. 4.

Figure 5

Sample Production Data

| Subtance | Feed Rate lb/hour | Moisture In % | Power KW | Moisture Out % | Water Removal | Water Removal Energy |
|---|---|---|---|---|---|---|
| | | (wet basis) | | (wet basis) | Rate (lb/hr) | BTU/lb of water |
| Deinking Sludge | 2658 | 51 | 110 | 26 | 898 | 417.9758 |
| Layer Manure | 4554 | 47 | 130 | 35 | 771 | 575.339 |
| Deinking Sludge | 874 | 54 | 75 | 11.5 | 420 | 609.3219 |
| Sewage Screenings | 1374 | 50 | 110 | 20 | 515 | 728.82 |
| Coal | 4800 | 15 | 140 | 4 | 550 | 868.5607 |
| Raw Hog+ P/S SLudge | 1500 | 50 | 130 | 26 | 500 | 887.1727 |
| Cow Dung + Sawdust | 1400 | 53 | 110 | 34 | 400 | 938.3557 |
| Pig Manure + wood | 2400 | 30 | 120 | 16 | 400 | 1023.661 |
| Spruce/Pine/ Fir/Cedar | 6353 | 32 | 150 | 28 | 353 | 1449.944 |
| Brewers Grain +Cow Feed | 1200 | 36 | 120 | 10 | 267 | 1533.574 |
| Spruce/ Pine/Fir | 663 | 48 | 140 | 15 | 257 | 1858.787 |
| Glacial Clay | 2262 | 10 | 120 | 1 | 206 | 1987.691 |

RECOVERY OF FUEL AND CLAY FROM A BIOMASS

FIELD OF THE INVENTION

This invention relates to the drying of biomass derived from wood such as waste or by-products of a sawmill or pulp and paper mill. The waste and by-products include wood chips, bark and pulp and paper sludge. The invention also relates to the drying of other waste organic such as manure and straw. More particularly, the invention relates to a method and apparatus for drying biomass material to make it suitable for use as a fuel and for the extraction of useful products such as clay from the material.

BACKGROUND OF THE INVENTION

Large quantities of waste products are generated at a saw mill and a pulp and paper mill and many of those products cannot be disposed of easily. Pulp and paper sludges are particularly difficult to dispose of. Such sludges, because of their high moisture content, cannot be incinerted without first being dried. The cost of drying them usually far exceeds any savings derived from incinerating them as an alternative source of heat or energy. For this reason other methods of disposal are generally used.

The most common method of disposal of pulp and paper sludges is at a landfill site. Less commonly it is disposed of by spreading it over waste land. Existing landfill and land spreading sites are being rapidly depleted because of the large quantities of sludge generated by mills. New sites are not becoming available at the rate required to meet the demand of mills because of environmental concerns.

SUMMARY OF THE INVENTION

When particles of waste products such as those mentioned above are introduced into a chamber having a rotor which spins at high speed, the particles are flung by centrifugal force against the side wall of the chamber and baffle plates within the chamber. The kinetic energy of multiple impact of the particles against the side wall and baffle plates of the chamber as well as against each other causes the temperature of the material to rise with resulting rapid evaporation or flashing of moisture in the material. In addition, the multiple impact causes moisture in the particles to be literally squeezed out of the solid material. The moisture becomes a fine mist which is expelled from the chamber while the solid particles are carried out of the chamber in a stream of air and are separated from the air in a cyclone separator.

By this means, the moisture content of the waste products is substantially reduced. The final product is particles composed substantially of wood fibre and, in the case of de-inking sludge, a significant quantity of clay. The clay can be separated by means of a sieve and the wood fibre that remains is suitable for use as a fuel. The clay can be reused in the paper-making process.

The process of the invention does not require the large amounts heat that conventional drying processes require to dry sludge. In fact, the process of the invention can be carried out with no additional heat in some cases.

Briefly, the process of the invention include the steps of: (i) providing a starting material of waste organic material (ii) introducing the waste material into a comminuting chamber having an interior space defined, in part, by side and lower walls and allowing the waste material to fall downwardly into the interior space; (iii) causing the falling waste material to strike the side wall with sufficient force to cause separation thereof into a first fraction which contains essentially water; and a second fraction which contains the waste material less the water in the first fraction; (iv) providing means by which the first fraction may discharge from the chamber; (v) causing air to flow through the chamber with sufficient velocity to carry the second fraction and any undischarged first fraction outwardly from the chamber and into a separator; (vi) causing air within the separator to separate the second fraction from step (v) into air and any undischarged first fraction from step (v); (vii) adjusting at least one of: (a) the speed at which the waste material strikes the side wall of step (iii); (b) the rate at which the waste material of step (ii) is added to the chamber; (c) the temperature within the chamber; (d) the temperature of the air within the separator; and (e) the rate of velocity of the air in step (v) in order to reduce the proportion of water in the second fraction from step (vi) to less than about 15 percent by weight; and (viii) recovering the second fraction from step (vi) as a final product.

BRIEF DESCRIPTION OF THE DRAWINGS

The process and apparatus of the invention are described with reference to the accompanying drawings in which:

FIG. 1 is a schematic diagram of the components of the apparatus of the invention;

FIG. 2 is an enlarged perspective view, partly cut away, of a torus mounted within the comminuting chamber;

FIG. 3 is an enlarged view of the baffle plates mounted to the bottom wall of the torus;

FIG. 4 shows the direction of air within the comminuting chamber; and

FIG. 5 is a table which sets out the results achieved when the process of the invention is carried out on various starting materials.

Like reference characters refer to like parts throughout the description of the drawings.

DESCRIPTION OF PREFERRED PROCESS

With reference to FIG. 1, a comminuting chamber 10 has an input chute 12 for raw material and an output duct 14 for comminuted product. The housing of the chamber includes a lower pan or wall 16, a cylindrical side wall 18 and a generally circular lid assembly 20. The output duct extends to the top cylinder of a cyclone separator 22. Solids separated from the air within the separator are collected at the bottom of the lower cone and discharge through an output chute 24. Star valves at the input chute 12 of the comminuting chamber and the output chute 24 of the separator, respectively, control the input and output from the comminuting chamber and cyclone separator and maintain intrinsic air pressure within the two devices.

A blower 30 causes air within the separator to flow through a duct 32 first to a demister 34, then to a heating coil 36 and finally to a number of jets 38 where the air is injected into the comminuting chamber. That air circulates through the chamber and recirculates into duct 14 where it returns to the separator.

The jets are spaced equidistantly around the periphery of the chamber. There may be four, six, eight or more jets. Where there are four, they are spaced 90 degrees apart, where there are six they are spaced 60 degrees apart and so on. A vent 40 on the lid allows some of the moisture-laden air within the chamber to escape to the atmosphere.

Within the comminuting chamber are a number of chains 42, preferably eight, which are mounted to a hub 44 and are rotated in a horizontal plane by a motor 46. A flywheel (not illustrated) may be splinted to the axle 48 which is driven by the motor to stabilize the draw of current by the motor.

Radially extending blades can be substituted for chains in the comminuting chamber and in most cases are preferred since the power consumed in causing them to rotate is less that required to rotate chains at the same rate. In addition, it is believed that a greater throughput of sludge is possible in the chamber where the chamber contains blades rather than chains. The blades are pivotally mounted to hub 44 so that their angle can be adjusted.

The blades should be designed such that they have a relatively low coefficient of drag. The preferred cross-section of the blade is a tear drop. The blades are described in detail in the two U.S. Pat. Nos. 5,839,671 and 6,024,307 discussed below.

Above the chains are baffle plates 50 and a frusto-conical cone or torus 52. The torus is hollow and, as illustrated in FIG. 2, its upper wall 54 is concave while its bottom wall 56 is flat. There is a circular opening 58 formed in the centre of the torus.

With reference to FIG. 3, there are eight baffle plates 50 which are attached to the bottom wall 56 of the torus such as by welding. Each plate has parallel front and rear faces 60, 62 the forward face being upstream of the direction of rotation 64 of the chains beneath the baffle plates. The angle between the forward faces of adjacent baffles, marked 66, is in the range of approximately 45 to 60 degrees.

The angle of the baffle plates relative to the bottom wall 56 of the torus is preferably about 120 degrees measured between the front wall 60 of the baffle plates and the bottom wall of the torus.

The baffle plates serve as a surface for particles driven radially outwardly by the chains to impinge upon. The baffles also direct air at the periphery of the chamber to flow inward and through the central opening in the torus Demister 34 controls the moisture level of the air within the chamber and the air that is discharged from it. The demister enhances the rate of drying of the air but is not essential. A fibre bed mist eliminator sold under the trade-mark BRINK and a wet scrubber sold under the trade-mark DYNAWAVE/BRINK both products of the Monsanto Enviro-Chem Company are suitable for this purpose.

Air which discharges from the demister is heated by heating coil 36 which is of conventional construction. There is a temperature sensor for measuring the temperature of the air which discharges from the coil and by means of the sensor, an accurate control over the temperature of the air can be achieved. The heating coil, while preferred, is not essential.

The configuration of the torus, baffle plates and the side wall of the chamber causes the air within the chamber to follow the path indicated by arrows 72 in FIG. 4.

The comminuting chamber is known and is described in U.S. Pat. Nos. 5,839,671 and 6,024,307 issued on Nov. 24, 1998 and Feb. 15, 2000, respectively, both to Sand et al. The subject matter of both patents are incorporated into this application by reference. The cyclone separator is well known to those familiar with the materials-handling art.

OPERATION

The starting material may be a biomass, in general, and specifically hog fuel such as sawdust, wood chips and bark as a waste or by-product of a sawmills or pulp and paper mill. It may also be a manure either alone or in combination with other organic matter. The manure may be from horses, cows, pigs, sheep, chickens. The waste from race tracks for example typically contain horse manure, straw and wood chips and such waste is a suitable starting material for the process of the invention The starting material may also be pulp and paper sludge. Such sludge is a waste product of the paper-making industry and may take a variety of forms. The sludge may be in the form of de-inking paper sludge, in the form of a so-called "primary paper sludge"or in the form of a so-called "secondary paper sludge". The sludge may also be a combination of any two or three of such sludges. De-inking sludge is a waste product generated during the manufacture of glossy magazines. The waste product contains clay, usually in the form of kaolin. "Primary paper sludge" is residual wood fibre and "secondary paper sludge" is also a residual wood sludge which contains a significant bacterial content.

Pulp and paper sludge has widely varying properties. In general, the sludge which is fed into the comminuting chamber should be no higher than about 60 percent by weight water. In some cases however, the moisture content cannot be as high as this. If the moisture content is too high, the sludge tends to coat the baffles and the interior walls of the chamber with undesirable consequences such as sudden surges in the consumption of power, uneven rate of output and so on.

If the moisture content of the feed is too high, the content of the sludge which discharges from the chamber likewise may be too high. To reduce the moisture content of the discharged sludge it can be recycled to the chamber and treated again. Any sludge which is recycled will of course reduce the amount of fresh sludge that can be added to the chamber with resulting decrease in the output from the chamber.

The composition of the feed will determine how high the moisture level can be. The moisture content may be too high if the level of moisture in the final product is too high or if the rate of output from the chamber is uneven or if there are unacceptable power surges.

Should the moisture content be too high, steps must be taken to reduce it. There are various ways of doing so. The sludge can be dried by a conventional screw or belt press or a combination of the two. Alternatively, the sludge can be dried by a conventional multi-pass dryer in which fuel is burned in a combustion chamber to produce a hot gas which is circulated through the dryer in order to heat the sludge to a temperature sufficiently high to drive out the moisture. The sludge can also be dried by air circulated through a dryer and heated by hot gas from a conventional heat exchanger.

The moisture content of the starting material can also be reduced by mixing the sludge with the final product of the process of the invention. In other words, the output product can be recycled and mixed with untreated sludge to produce a starting material having the required moisture content. Alternatively, the starting material can be combined with material having a relatively low moisture content such as wood chips or hog fuel to produce a starting mixture having a moisture level below the acceptable upper limit.

The starting material should be composed of particles which do not exceed about 10 cm in size. Larger particles tend to form bridges within the chamber and clog it. Such particles can also cause undesirable surges in consumption of power by the rotor with resulting damage to it or to other components of the comminuting chamber.

Non-organic material such as ferrous or non-ferrous metallic objects should be removed from the starting material before it is fed to the chamber. A conventional electromagnet or belt magnet can be used for this purpose. Stones are removed by a conventional de-stoner.

The starting material is fed through a star valve at the inlet 12 of the chamber where it falls down onto the concave upper wall of the torus and slides down the wall and into the central opening 58 of the torus. From there the material falls into the path of the rotor 42 made up chains or blades and is flung by centrifugal force against the side wall 10 and the baffle plates 50 with resulting comminution of the material.

The kinetic energy of multiple impact of the particles against the side wall and baffle plates of the chamber as well as against each other causes the temperature of the material to rise with resulting rapid evaporation or flashing of moisture in the material. In addition, the multiple impact causes moisture in the particles to be literally squeezed out of the solid material. The energy of impact and kinetic heat also kills many of the pathogens and coliforms in the material. The centrifugal acceleration of the particles within the chamber may also enhance the rate of destruction of the pathogens and coliforms.

The moisture which escapes from the material does so in the form of steam. Once separated, the moisture immediately recondenses into a fine mist since the temperature within the chamber typically is about 70 degrees C. or less. While some of the mist is exhausted through vent 40, most is carried upwardly in the particle-laden air which travels to the cyclone separator. From the separator the mist flows to demister 34 where it is removed from the air.

Solid particles are carried out of the chamber in a stream of air and are separated from the air in cyclone separator 22. The particles are substantially drier than they were in the starting material.

As illustrated in FIG. 4, the direction of movement of air within the chamber is indicated by arrows 72. As will be observed, the rotor causes the flow of air to double back upon itself below the baffle plates 50 and to divide into two streams. One stream 72*a* flows upwardly in the annular space between the periphery of the torus and the side wall of the chamber. The other stream 72*b* flows centrally upward through the central opening in the torus. Both streams carry most of the particles of material with them and exit through output duct 14.

Air within the chamber is set in motion by the spinning rotor and flows into the cyclone separator where it is separated from the particles of material and is forced by blower 30 through duct 32 and issues as a stream into the chamber. A nozzle at the point of entry of the air into the chamber directs the air to enter tangentially to the side wall of the chamber as well as to the periphery of the torus.

As previously discussed, the jet splits into two streams, one, 72*a,* elevates the particles of material between the periphery of the torus and the side wall of the chamber while the other, 72*b* assists in the evacuation of particles of material in the centre of the chamber. Both streams meet and exit through duct 14 as previously indicated and carry the particles of material with them.

There are many factors which affect the amount of water that is extracted from the starting material. Those factors include the rate at which the material is fed into the comminuting chamber, the velocity of the material at the moment of impact with the side wall and baffles, the temperature within the chamber; the temperature of the air within the cyclone separator, the velocity of the air within the comminuting chamber and so on. The effect that these factors have are as follows:

(1) the rate of feed: the higher the rate, the higher the level of moisture will be in the final product.

(2) the velocity of the material at the moment of impact: the greater its velocity the higher the rate of extraction of moisture will be. As indicated above, the faster the rotor rotates, the higher the velocity of the material will be.

(3) the temperature within the chamber and the cyclone separator: The preferred range of temperature is about 45 degrees to about 80 degrees C. and the more preferred range is about 50 degrees to about 65 degrees C. In most cases, the temperature within the chamber and separator will inherently be in this range if they are operating satisfactorily and accordingly there will be no need to control the temperature within them.

(4) the velocity of the air within the comminuting chamber. The higher the velocity, the higher the throughput of material through the chamber and cyclone and the higher the output of the process. In addition, the higher the velocity of air, the more moisture will be removed from the solid particles.

The comminuting chamber and cyclone separator should be operated in a way that will yield a final product containing less than about 15 percent by weight water. This result will be achieved by adjusting the feed rate, the temperature within the chamber and separator, the rate of rotation of the rotor, the velocity of the air and so on.

The dried particles of material and water droplets are carried by the air in the duct to the cyclone separator where the particles are separated and discharge through a star valve at the bottom of the separator as the final product of the process. The air and some moisture is recirculated to the comminuting chamber through jet 38 while the remaining moisture is removed by demister 34.

De-inking sludge usually contains a significant amount of clay. That clay is commonly kaolin but other clays are also found in such sludge. Clay can be separated from the final product simply by classifying the particles according to size. Particles larger than about 250 microns are composed substantially entirely of wood fibre while smaller particles are composed chiefly of clay. The dried particles can be classified by various means such as by a trommel and by a screen.

EXAMPLE 1

To test the performance of the process of the invention, various starting materials were fed into the comminuting chamber at various rates. The moisture content of the starting material and final product were measured and the consumption of power was monitored. The results are set out of the FIG. 5.

The results show that the moisture content of manures and paper sludge including de-inking sludge is significantly reduced by the process of the invention. The moisture content can be reduced to less than 10 percent if that is desired. FIG. 5 also shows that the subject process uses less energy to remove a given amount of water than most commercially available dryers employing heat to evaporate the water. In fact the energy usage of the subject process is less than the latent heat of water. That is because the subject process uses primarily mechanical forces to reduce moisture content and only incidentally evaporation.

EXAMPLE 2

Waste from a race track was used as the starting material. The waste contained 10% horse manure, 30% straw, 30% hay and the balance wood chips (all percentages are by weight). The straw was shredded using a conventional shredder into 2 cm strips before being mixed with the other substances. The starting material was fed into the comminuting chamber and separator of the invention The final product was a fine dry powder which could be burned as a fuel in a conventional dust-burner.

EXAMPLE 3

Sewage screenings i.e. sediments from a sewage treatment plant were used as the starting material of the subject process. The moisture content of the screenings was reduced from 50 to 20 percent moisture using less energy than the latent heat of water in the screenings. The dried screenings can be recycled to the process thus eliminating the need to dispose of them. FIG. 5 sets out the results.

It will be understood of course that modifications can be made in the process and apparatus of the invention without departing from the scope and purview of the invention as described and claimed herein.

We claim:

1. A process for reducing the moisture content of organic material to a level at which said material is suitable for use as a fuel including the steps of:

(i) providing a starting material of organic material:

(ii) introducing said material into a comminuting chamber having an interior space defined, in part, by side and lower walls and allowing said material to fall downwardly into said interior space;

(iii) causing said falling material to strike said side wall with sufficient force to cause separation thereof into a first fraction which contains essentially water; and a second fraction which contains the material less the water in said first fraction;

(iv) providing means by which said first fraction may discharge from said chamber;

(v) causing air to flow through said chamber with sufficient velocity to carry said second fraction and any undischarged first fraction outwardly from said chamber and into a separator having an interior wall;

(vi) causing air within said separator to drive said second fraction from step (v) into contact with said interior wall with resulting separation of said second fraction from air and any undischarged first fraction from step (v);

(vii) adjusting at least one of: (a) the speed at which the waste material strikes the side wall of step (iii); (b) the rate at which the waste material of step (ii) is added to the chamber; (c) the temperature within the chamber; (d) the temperature of the air within the separator; and (e) the rate of velocity of the air in step (v) in order to reduce the proportion of water in the second fraction from step (vi) to less than about 15 percent by weight; and (viii) recovering said second fraction from step (vi) as a final product, and further including the step of separating said final product from step (viii) into a first portion of larger than about 250 microns composed substantially entirely of wood fibre and a second portion of smaller than about 250 microns composed substantially entirely of clay.

2. The process of claim 1 further including the step of adjusting the moisture content of the starting material of step (i) to no more than about 60 percent by weight water.

3. The process of claim 1 including the step of providing impelling means located within said interior space for causing said falling material of step (iii) to strike said side wall.

4. The process of claim 1 further including the step of providing a torus having a conical upper wall and a planar lower wall within said chamber for directing said falling material centrally through said chamber.

5. The process of claim 4 further including the step of providing a plurality of baffle plates beneath said torus for directing the flow of said falling material within said torus.

6. The process of claim 1 further including the step of recycling sufficient quantity of the second fraction from step (viii) to the material of step (i) to produce said starting material.

7. The process of claim 1 further including the step of adjusting the temperature in said interior space to a value in the range of about 45 to about 80degrees Celsius.

8. A process for reducing the moisture content of organic material to a level at which said material is suitable for use as a fuel including the steps of:

(i) providing a starting material of organic material:

(ii) introducing said material into a comminuting chamber having an interior space defined, in part, by side and lower walls and allowing said material to fall downwardly into said interior space;

(iii) causing said falling material to strike said side wall with sufficient force to cause separation thereof into a first fraction which contains essentially water; and a second fraction which contains the material less the water in said first fraction;

(iv) providing means by which said first fraction may discharge from said chamber;

(v) causing air to flow through said chamber with sufficient velocity to carry said second fraction and any undischarged first fraction outwardly from said chamber and into a separator having an interior wall;

(vi) causing air within said separator to drive said second fraction from step (v) into contact with said interior wall with resulting separation of said second fraction from air and any undischarged first fraction from step (v);

(vii) adjusting at least one of: (a) the speed at which the waste material strikes the side wall of step (iii); (b) the rate at which the waste material of step (ii) is added to the chamber; (c) the temperature within the chamber; (d) the temperature of the air within the separator; and (e) the rate of velocity of the air in step (v) in order to reduce the proportion of water in the second fraction from step (vi) to less than about 15 percent by weight; and (viii) recovering said second fraction from step (vi) as a final product; and further including the step of combining a mixture of primary material containing pulp and paper sludge and a secondary material containing wood pulp having a substantial bacterial content with at least an equal weight of de-inking material to produce the starting material of step (i).

9. The process of claim 8 further including the step of adjusting the moisture content of the starting material of step (i) to no more than about 60 percent by weight water.

10. The process of claim 8 including the step of providing impelling means located within said interior space for causing said falling material of step (iii) to strike said side wall.

11. The process of claim 8 further including the step of providing a torus having a conical upper wall and a planar lower wall within said chamber for directing said falling material centrally through said chamber.

12. The process of claim 11 further including the step of providing a plurality of baffle plates beneath said torus for directing the flow of said falling material within said torus.

13. The process of claim 8 further including the step of recycling sufficient quantity of the second fraction from step (viii) to the material of step (i) to produce said starting material.

14. A process for reducing the moisture content of organic material to a level at which said material is suitable for use as a fuel including the steps of:

(i) providing a starting material of organic material:

(ii) introducing said material into a comminuting chamber having an interior space defined, in part, by side and lower walls and allowing said material to fall downwardly into said interior space;

(iii) causing said falling material to strike said side wall with sufficient force to cause separation thereof into a first fraction which contains essentially water; and a second fraction which contains the material less the water in said first fraction;

(iv) providing means by which said first fraction may discharge from said chamber;

(v) causing air to flow through said chamber with sufficient velocity to carry said second fraction and any undischarged first fraction outwardly from said chamber and into a separator having an interior wall;

(vi) causing air within said separator to drive said second fraction from step (v) into contact with said interior wall with resulting separation of said second fraction from air and any undischarged first fraction from step (v);

(vii) adjusting at least one of: (a) the speed at which the waste material strikes the side wall of step (iii); (b) the rate at which the waste material of step (ii) is added to the chamber; (c) the temperature within the chamber; (d) the temperature of the air within the separator; and (e) the rate of velocity of the air in step (v) in order to reduce the proportion of water in the second fraction from step (vi) to less than about 15 percent by weight; and (viii) recovering said second fraction from step (vi) as a final product; and further including the step of adjusting the temperature in said interior space to a value in the range of about 45 to about 80 degrees Celsius.

15. The process of claim 14 further including the step of adjusting the moisture content of the starting material of step (i) to no more than about 60 percent by weight water.

16. The process of claim 14 including the step of providing impelling means located within said interior space for causing said falling material of step (iii) to strike said side wall.

17. The process of claim 14 further including the step of providing a torus having a conical upper wall and a planar lower wall within said chamber for directing said falling material centrally through said chamber.

18. The process of claim 17 further including the step of providing a plurality of baffle plates beneath said torus for directing the flow of said falling material within said torus.

19. The process of claim 14 further including the step of recycling sufficient quantity of the second fraction from step (viii) to the material of step (i) to produce said starting material.

* * * * *